US011927401B2

United States Patent
Rambo (10) Patent No.: US 11,927,401 B2
(45) Date of Patent: Mar. 12, 2024

(54) HEAT EXCHANGE SYSTEM (71) Applicant: General Electric Company, Schenectady, NY (US)

(72) Inventor: Jeffrey Douglas Rambo, Mason, OH (US)

(73) Assignee: General Electric Company, Schenectady, NY (US)

(*) Notice: Subject to any disclaimer, the term of this patent is extended or adjusted under 35 U.S.C. 154(b) by 210 days.

(21) Appl. No.: 17/159,302

(22) Filed: Jan. 27, 2021

(65) Prior Publication Data
US 2022/0236013 A1 Jul. 28, 2022

(51) Int. Cl.
*F28D 7/00* (2006.01)
*F02C 7/12* (2006.01)
*F28D 21/00* (2006.01)
*F28F 27/02* (2006.01)

(52) U.S. Cl.
CPC .............. *F28D 7/0075* (2013.01); *F02C 7/12* (2013.01); *F28F 27/02* (2013.01); *F05D 2220/32* (2013.01); *F05D 2260/20* (2013.01); *F28D 2021/004* (2013.01)

(58) Field of Classification Search
CPC .... F28D 7/0075; F28D 2021/004; F02C 7/12; F28F 27/02; F05D 2220/32
See application file for complete search history.

(56) References Cited

U.S. PATENT DOCUMENTS

| 7,434,765 | B2 | 10/2008 | Zielinski et al. |
| 9,096,207 | B2* | 8/2015 | Madurai Kumar ... B60W 10/26 |
| 9,988,986 | B2 | 6/2018 | Snape et al. |
| 10,260,419 | B2 | 4/2019 | Cerny et al. |
| 10,352,191 | B2* | 7/2019 | Weiner .................... F02K 3/115 |
| 10,422,586 | B2 | 9/2019 | Ribarov et al. |
| 10,612,860 | B2 | 4/2020 | Ribarov et al. |
| 10,697,371 | B2* | 6/2020 | Sennoun ................. F01M 5/002 |
| 10,746,484 | B2 | 8/2020 | Zhang |
| 2019/0170450 | A1 | 6/2019 | Thomas et al. |
| 2020/0332715 | A1 | 10/2020 | Ribarov |

FOREIGN PATENT DOCUMENTS

| CN | 1764498 A * | 4/2006 | ............ B60H 1/032 |
| EP | 3623606 A1 | 3/2020 | |
| EP | 3726028 A1 | 10/2020 | |
| WO | WO2018/065304 A1 | 4/2018 | |

* cited by examiner

*Primary Examiner* — Jon T. Schermerhorn, Jr.
(74) *Attorney, Agent, or Firm* — Dority & Manning, P.A.

(57) ABSTRACT

A heat exchange system for a gas turbine engine includes a first heat exchanger that defines a first heat source flowpath, a second heat exchanger that defines a second heat source flowpath, and a coolant fluid circuit. The coolant fluid circuit defines a first coolant flowpath that extends through the first heat exchanger and is in thermal communication with the first heat source flowpath, and a second coolant flowpath that extends through the second heat exchanger and is in thermal communication with the second heat source flowpath. The first coolant flowpath and the second coolant flowpath are arranged in a parallel flow configuration.

17 Claims, 6 Drawing Sheets

HEAT EXCHANGE SYSTEM

FIELD

The present disclosure relates to a heat exchange system, such as a heat exchange system for a gas turbine engine.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engine and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel. Other fluids have been determined to be efficient heat sinks to receive at least some of such heat during operations of the gas turbine engine. The inventors of the present disclosure have come up with various configurations and devices to improve on currently known heat exchange systems.

BRIEF DESCRIPTION

Aspects and advantages of the invention will be set forth in part in the following description, or may be obvious from the description, or may be learned through practice of the invention.

In one exemplary embodiment of the present disclosure, a heat exchange system for a gas turbine engine is provided. The heat exchange system includes a first heat exchanger that defines a first heat source flowpath, a second heat exchanger that defines a second heat source flowpath, and a coolant fluid circuit. The coolant fluid circuit defines a first coolant flowpath that extends through the first heat exchanger and is in thermal communication with the first heat source flowpath, and a second coolant flowpath that extends through the second heat exchanger and is in thermal communication with the second heat source flowpath. The first coolant flowpath and the second coolant flowpath are arranged in a parallel flow configuration.

In another exemplary embodiment of the present disclosure, a gas turbine engine having a compressor section, a combustion section, and a turbine section is provided. The gas turbine system includes a first heat generating component, a second heat generating component, and a heat exchange system. The heat exchange system includes a first heat exchanger that defines a first heat source flowpath, a second heat exchanger that defines a second heat source flowpath, and a coolant fluid circuit. The coolant fluid circuit defines a first coolant flowpath that extends through the first heat exchanger and is in thermal communication with the first heat source flowpath, and a second coolant flowpath that extends through the second heat exchanger and is in thermal communication with the second heat source flowpath. The first coolant flowpath and the second coolant flowpath are arranged in a parallel flow configuration.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "fluid" may be a gas or a liquid. The term "fluid communication" means that a fluid is capable of making the connection between the areas specified.

The term "thermal communication" means that heat is capable of being transferred between the areas specified.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, a gas turbine engine can be equipped with one or more heat exchange systems. The heat exchange system can be provided to cool certain systems of the gas turbine engine or of the aircraft that the gas turbine engine is installed upon. For example, the heat exchange system can be provided to cool one or more heat generating components, such as a gearbox, a bearing, a pump, a fan blade pitch change mechanism, or a motor-generator, to name a few. The heat exchange system can cool these components by cooling a relatively hot fluid, such as a lubricant that is delivered to those components, with a cooler fluid, such as fuel. When fuel is used as a coolant fluid, instead of other coolant fluids such as supercritical fluids, dielectric fluids, air, or synthetic heat transfer fluids, the heat exchange system can have the additional benefit of heating the fuel. Heating the fuel of a gas turbine engine can increase the efficiency of the engine by reducing the amount of fuel needed to achieve desired combustor firing temperatures. Additionally, heating the fuel can improve the power output of the gas turbine engine.

In at least one embodiment, the heat exchange system includes a coolant fluid circuit that has a first coolant flowpath that extends through a first heat exchanger and a second coolant flowpath that extends through a second heat exchanger. Each of the coolant flowpaths can cool a relatively hot fluid that is flowing through a heat source flowpath that flows through its respective heat exchanger. The first and second coolant flowpaths can be arranged in a parallel flow configuration, instead of in a series flow configuration. As will be appreciated from the discussion herein, arranging the coolant flowpaths in a parallel flow configuration can minimize the pressure drop of the coolant fluid circuit. Additionally, when fuel is used as a coolant fluid circuit, arranging the coolant flowpaths in a parallel flow configuration can reduce the reaction time of the engine.

The heat exchange system may further include a plurality of valves or a diverter that can selectively provide at least a portion of the flow to one or more of the coolant flowpaths and/or to a bypass flowpath. As will be explained in greater detail, including a diverter or a plurality of valves, instead of a single two-way valve or no valves, can allow for the optimization of the amount of coolant flow provided to each of the heat exchangers and/or to the bypass flowpath. Allowing the optimization of the coolant flow can allow for a maximum amount of coolant fluid to be provided to the bypass flowpath, and a minimum amount of coolant fluid to be provided to the coolant flowpaths. Allowing only a minimum amount of coolant fluid to be provided to the coolant flowpaths reduces the amount of flow that passes through fluid-restricting devices, such as heat exchangers, which can result in a pressure loss of the coolant fluid circuit. When fuel is used as the coolant fluid, reducing pressure loss can increase the efficiency or power output of the gas turbine engine. When fuel is used as a coolant fluid, maximizing the amount of fuel delivered to the bypass flowpath can reduce the reaction time of the engine.

In at least one embodiment, components of the heat exchange system are arranged in close proximity to each other and/or as a unitary component, instead of arranged separately and/or far apart from each other. When the components of the heat exchange system are arranged in close proximity to each other and/or as a unitary component, heat can be transferred between the components, through the conductive material that is nearby. In this way, one or more of the heat source flowpaths can be further cooled by the conductive material that surrounds them, via induction.

Systems are described herein that extend beyond the claimed heat exchange system. It will be appreciated that these systems are provided by way of example only, and the claimed systems are not limited to applications using or otherwise incorporated with these other systems. The disclosure is not intended to be limiting. For example, it should be understood that one or more embodiments described herein may be configured to operate independently or in combination with other embodiments described herein.

Figure 1:
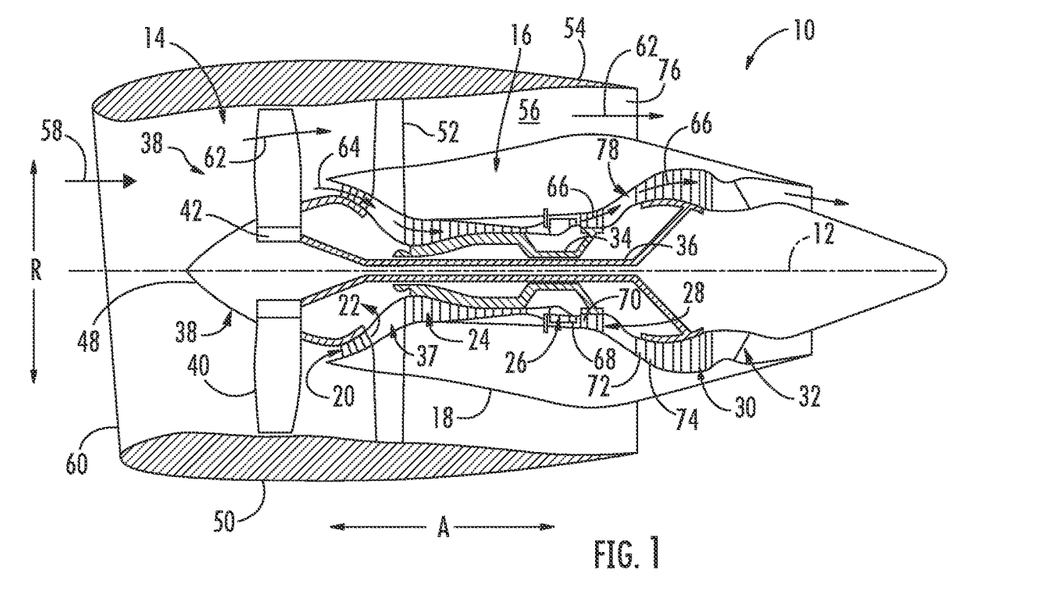
FIG. 1 is a cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a fan 38 having a plurality of fan blades 40 coupled to a rotor disk 42 in a spaced apart manner. As depicted, the fan blades 40 extend outwardly from rotor disk 42 generally along the radial direction R. The disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. It should be appreciated that the nacelle 50 may be configured to be supported relative to the core 16 by a plurality of circumferentially-spaced outlet guide vanes 52. Moreover, a downstream section 54 of the nacelle 50 may extend over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan 38 nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured as a variable pitch fan including, e.g., a suitable actuation assembly for rotating the plurality of fan blades about respective pitch axes, the turbofan engine 10 may be configured as a geared turbofan engine having a reduction gearbox between the LP shaft 36 and fan section 14, etc. It should also be appreciated, that in still other exemplary embodiments, aspects of the present disclosure may be incorporated into any other suitable gas turbine engine. For example, in other exemplary embodiments, aspects of the present disclosure may be incorporated into, e.g., turboprop engine.

Figure 2:
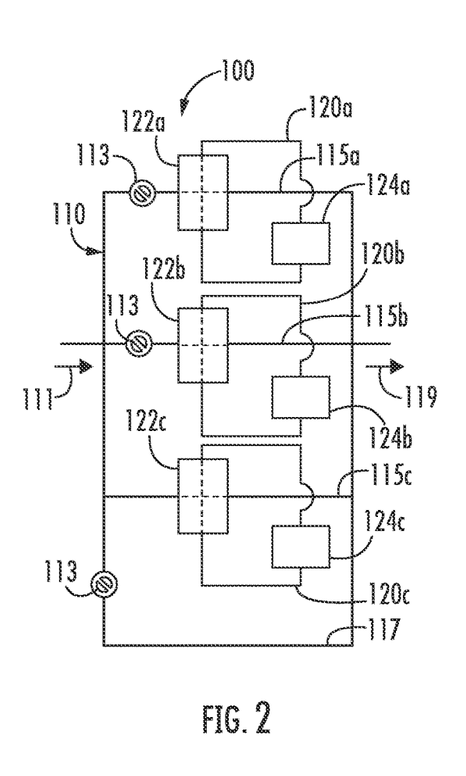
FIG. 2 is a schematic view of a heat exchange system in accordance with an exemplary aspect of the present disclosure.

Referring now to FIG. 2, a schematic view of a heat exchange system 100 in accordance with an exemplary embodiment of the present disclosure is shown. The heat exchange system 100 includes a plurality of heat exchangers 122a-c, a plurality of heat source flowpaths 120a-c, each extending through a heat exchanger 122, and a coolant fluid circuit 110. The coolant fluid circuit 110 includes a plurality of coolant flowpaths 115a-c, each extending through a heat exchanger 122a-c. For the embodiment shown, the coolant fluid circuit 110 includes a bypass flowpath 117 that does not extend through a heat exchanger 122.

The coolant fluid that flows through the coolant fluid circuit 110 can be any fluid that can transfer heat between the heat source flowpaths 120 and the coolant flowpaths 115. For example, the coolant fluid can be a fuel, a dielectric fluid, air, or a heat transfer fluid such as DOWTHERM or THERMINOL.

The coolant flowpaths 115 of the coolant fluid circuit 110 and the heat exchangers 122 are arranged in a parallel flow configuration. Each of the coolant flowpaths 115 have a common inlet of a flow of fluid, which is the input 111 to the coolant fluid circuit 110, and have a common outlet of the flow of fluid, which is the output 119 of the coolant fluid circuit 110. Additionally, the coolant flowing from the input 111 branches off into multiple coolant flowpaths 115 and then into respective heat exchangers 122. The parallel configuration may allow the flow of coolant through each coolant flowpath 115 to be independently adjusted or discontinued while the flow of coolant fluid continues through one or more of the other coolant flowpaths 115.

The bypass flowpath 117 can also be arranged in a parallel flow configuration with the coolant flowpaths 115 such that the bypass flowpath 117 has a common source of a flow of fluid with the coolant flowpaths 115 and a common outlet of the flow of fluid with the coolant flowpaths 115.

Each of the heat source flowpaths 120 can be a flowpath circuit, such as an oil circuit, and can include a heat generating component 124. The relatively hot fluid flowing through each of the heat source flowpaths 120 can be provided to the respective heat generating component 124. The heat generating component 124 can be a gearbox, a bearing, a pump, a fan blade pitch change mechanism, or a motor-generator, to name a few. Additionally, each of the heat source flowpaths 120 are fluidly independent from one another such that they are not in fluid communication. Also, each of the heat source flowpaths 120 are fluidly independent from the coolant fluid circuit 110 such that each of the heat source flowpaths 120 are not in fluid communication with the coolant fluid circuit 110.

In this example, the heat exchange system 100 includes three heat exchangers 122a-c, three heat source flowpaths 120a-c, and three coolant flowpaths 115a-c. However, it should be understood that the heat exchange system 100 can include any number of heat exchangers 122, heat source flowpaths 120, and coolant flowpaths 115. For example, two, four, five, six, or more heat exchangers 122, heat source flowpaths 120, and coolant flowpaths 115.

The heat exchange system 100 can include a plurality of valves 113 configured to control a flow of a fluid. For example, each of the valves 113 can control a flow of a coolant fluid, such as fuel, flowing through one of the coolant flowpaths 115 and/or through the bypass flowpath 117. In this example, coolant flowpaths 115a and 115b include a valve 113 to regulate an amount of the coolant fluid that is flowing through the respective heat exchanger 122. Each of the valves 113 can selectively open and close, either partially or fully, to control the amount of the coolant fluid that flows through each of their respective coolant flowpaths 115 and each of the respective heat exchangers 122. Coolant flowpaths 115c does not include a valve 113; however, the other valves 113 that are included in the heat exchange system 100 can collectively control the amount of flow flowing through coolant flowpath 115c. For example, if the valves allow twenty percent of the flow to be provided to each of coolant flowpath 115a, 115b, and bypass flowpath 117, the remaining flow, which is forty percent of the flow, is provided to coolant flowpath 115c. It should be understood, however, that in some examples, an additional valve could be provided to directly control the flow provided to coolant flowpath 115c.

Each heat exchanger 122 is configured to cool the relatively hot fluid flowing through the respective heat source flowpath 120 and heat the coolant fluid that is flowing through the respective coolant flowpath 115. This is accomplished by arranging each heat source flowpath 120 to be in thermal communication with a respective coolant flowpath 115. More specifically, the portions of the heat source flowpaths 120 that extend through the heat exchangers 122 are arranged to be in thermal communication with a portion of one of the coolant flowpaths 115 that extend through the same heat exchanger 122. For example, the portion of the first heat source flowpath 120a that extends through the first heat exchanger 122a is in thermal communication with the portion of the first coolant flowpath 115a that extends through the first heat exchanger 122a.

Even though flowpath 120 has been described as a heat source flowpath and flowpaths 115 and circuit 110 have been described as coolant flowpaths and coolant circuits, it should be understood that a configuration is contemplated where the circuit 110 and flowpaths 115 are heat source flowpaths and the flowpaths 120 are coolant source flowpath. For example, flowpaths 115 could be heat source flowpaths and in fluid communication with each other and arranged in a parallel configuration, and the flowpaths 120 could be coolant flowpaths and are arranged in either a parallel or series configuration.

Figure 3:
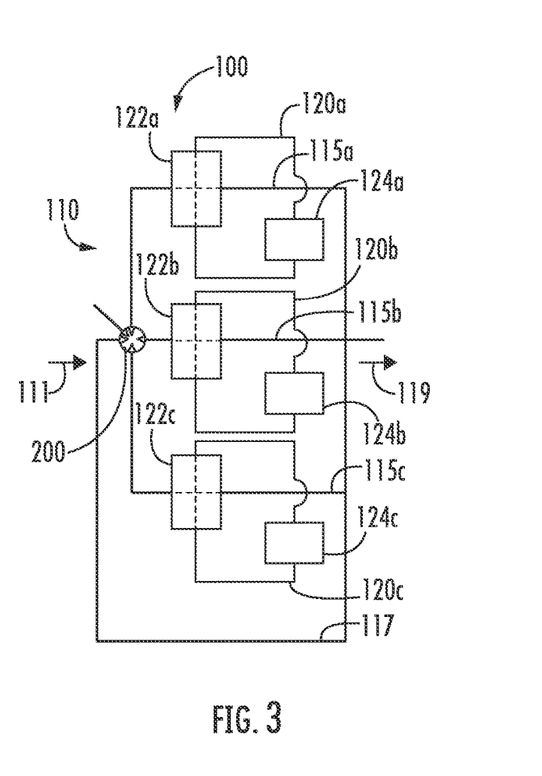
FIG. 3 is a schematic view of a heat exchange system in accordance with an exemplary aspect of the present disclosure.

Referring now to FIG. 3, a schematic view of a heat exchange system 100 in accordance with an exemplary embodiment of the present disclosure is shown. The heat exchange system 100 of FIG. 3 may be configured in a similar manner as the exemplary heat exchange system 100 described above with reference to FIG. 2. For example, the coolant flowpaths 115a-c of the coolant fluid circuit 110 in this example are also arranged in a parallel flow configuration.

However, for the exemplary embodiment of FIG. 3, the heat exchange system 100 includes a diverter 200 that is configured to separate a flow of fluid into two or more branches and can be further configured to discontinue and/or throttle the flow of fluid into each of the two or more branches, such as the coolant flowpaths 115. For example, the diverter 200 can be a port diverter valve, a rotary multi-port valve, or the segmented diverter of FIG. 4 or the drum diverter of FIG. 6, which will both be explained in more detail, below.

The diverter 200 is configured to selectively provide at least a portion of the flow to one or more of the coolant flowpaths 115 and/or the bypass flowpath 117. In one example, the diverter 200 can provide equal amounts to each of the coolant flowpaths 115 and no flow to the bypass flowpath 117. In another example, the diverter 200 can provide equal amounts to each of the coolant flowpaths 115 and to the bypass flowpath 117. In another example, the diverter 200 can provide unequal amounts to two or more of the coolant flowpaths 115 and/or to the bypass flowpath 117. For example, one of the coolant flowpaths 115 can receive more than one and a half times as much of the flow as another one of the coolant flowpaths 115, as measured in pounds per square inch (PSIA). For example, one of the coolant flowpaths 115 can receive at least twice as much, such as at least four times as much, such as at least six times as much of the flow as another one of the coolant flowpaths 115, and up to about ten times as much, such as about eight times as much, such as about six times as much of the flow as another one of the coolant flowpaths 115. Even though several examples have been provided, it should be understood that many other variations regarding the amount of flow to be diverted to each of the coolant flowpaths 115 and the bypass flowpath 117 are contemplated.

Figure 4:
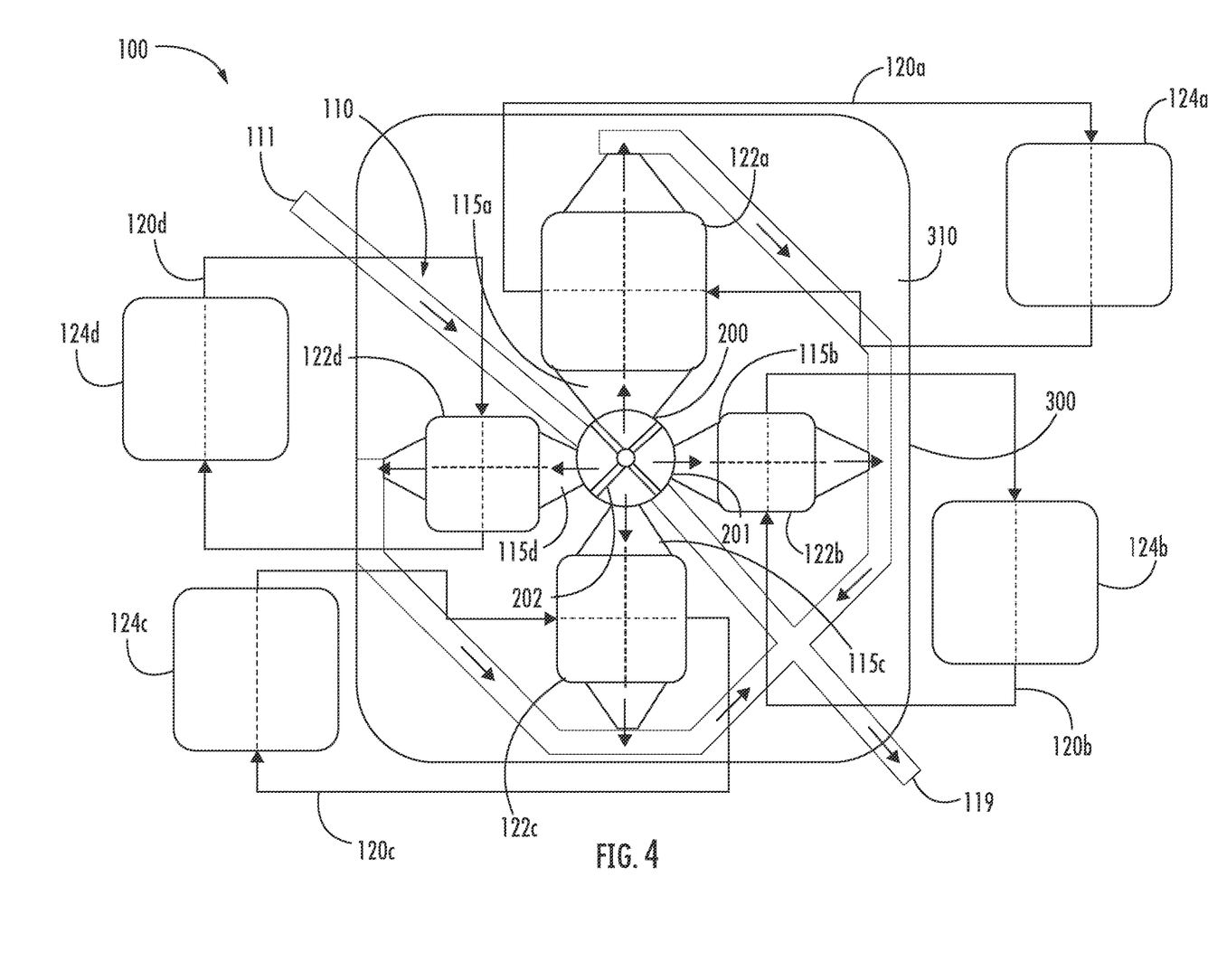
FIG. 4 is a schematic view of a heat exchange system in accordance with an exemplary aspect of the present disclosure.
Figure 5:
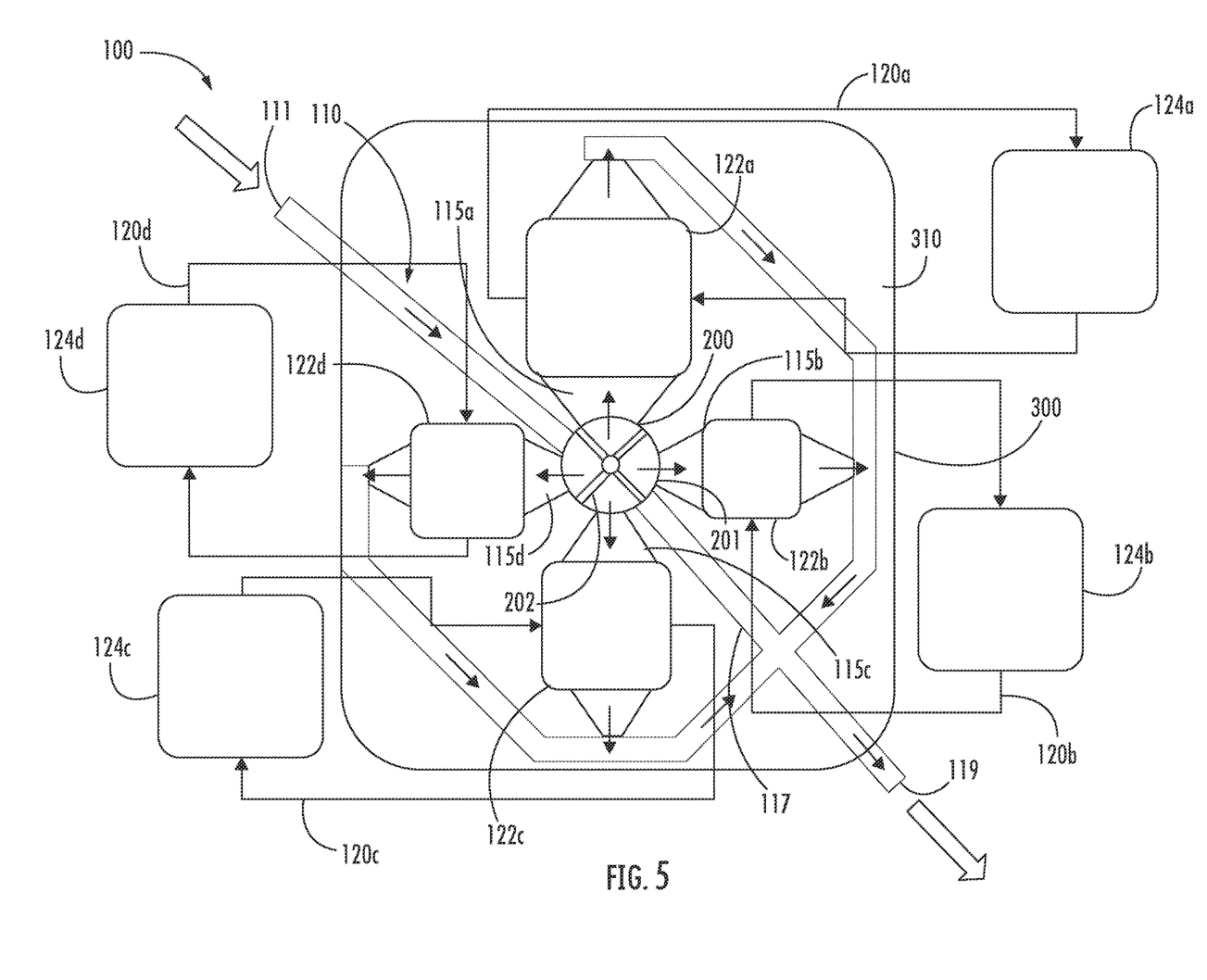
FIG. 5 is a schematic view of a heat exchange system in accordance with an exemplary aspect of the present disclosure.

Referring now to FIGS. 4 and 5, schematic views of heat exchange systems 100 in accordance with additional exemplary embodiments of the present disclosure are shown. Like the examples of FIGS. 2 and 3, the coolant flowpaths 115a-d of the coolant fluid circuit 110 and the heat exchangers 122a-d are arranged in a parallel flow configuration. As such, the heat exchange system 100 may be configured in a similar manner as the exemplary heat exchange systems 100 described above with reference to FIGS. 2 and 3. For example, each of the coolant flowpaths 115 have a common inlet of a flow of fluid, which is the input 111 to the coolant fluid circuit 110, and have a common outlet of the flow of fluid, which is the output 119 of the coolant fluid circuit 110. Additionally, the coolant flowing from the input 111 branches off into multiple coolant flowpaths 115 and then into respective heat exchangers 122. The parallel configuration allows the flow of coolant through each coolant flowpath 115 to be independently adjusted or discontinued while the flow of coolant fluid continues through one or more of the other coolant flowpaths 115.

In the example of FIG. 4, the heat exchange system 100 does not include a bypass flowpath 117, whereas the heat exchange system 100 of FIG. 5 includes a bypass flowpath 117 that is arranged in parallel configuration with the coolant flowpaths 115.

Each of the heat source flowpaths 120 are fluidly independent from the coolant fluid circuit 110 such that each of the heat source flowpaths 120 are not in fluid communication with the coolant fluid circuit 110. Additionally, each of the heat source flowpaths 120 are fluidly independent from all other heat source flowpaths 120 in the heat exchange system 100 such that none of the heat source flowpaths 120 are in fluid communication with each other.

In this example, the heat exchange system 100 includes four heat exchangers 122a-d, four heat source flowpaths 120a-d, and four coolant flowpaths 115a-d. However, it should be understood that the heat exchange system 100 can include any number of heat exchangers 122, heat source flowpaths 120, and coolant flowpaths 115. For example, two, three, five, six, or more heat exchangers 122, heat source flowpaths 120, and coolant flowpaths 115.

In some examples, which are not shown, one or more of the coolant flowpaths 115 pass through a plurality of heat exchangers 122, each of the heat exchangers 122 being associated with a different heat source flowpath 120. In this way, the heat exchangers 122 are arranged in a series-parallel circuit.

The heat exchange system 100 can include a diverter 200 that is configured to separate a flow of fluid into two or more branches and can be further configured to discontinue and/or throttle the flow of fluid into each of the two or more branches, such as the coolant flowpaths 115. For example, the diverter 200 can be a port diverter valve, a rotary multi-port valve, the drum diverter of FIG. 6, which will both be explained in more detail, below, or a segmented diverter, as shown.

As shown, the segmented diverter 200 is partitioned into segments 201. The partitions 202 between the segments 201 can include windows (not shown) that allow the flow of coolant fluid from the input 111 to enter a first segment 201 and then flow to adjacent segments 201. From each of the segments 201, the coolant fluid can flow into its respective coolant flowpath 115. The partitions can include sliding doors (not shown) that can be used to close, either partially or fully, each of the windows to adjust the amount of flow provided to each of the segments 201.

The non-moving portions of the diverter 200 can be coupled, either directly or indirectly, to one or more of the heat exchangers 122, or can be a unitary component with one or more of the heat exchangers 122. The diverter 200 can be positioned approximately equidistant from each of the heat exchangers 122 and/or can be arranged in close proximity to each of the heat exchangers 122.

Two or more of the non-moving components of the diverter 200, the heat exchangers 122, the coolant flowpaths 115, and a portion of each of the heat source flowpaths 120 can form a heat transfer unit 300 such that each is in thermal communication with another. The heat transfer unit 300 can be configured as a heatsink to passively transfer heat. The heat transfer unit 300 can include features, such as fins, that increases its surface area that is in contact with a cooler fluid, such as air, that can surround it.

Certain components of the heat transfer unit 300 can be in thermal communication with each other via a thermally conductive material 310 extending between the components. In certain exemplary embodiments, the thermally conductive material 310 may be a metal material. The term "between" in this context does not necessarily mean that that the thermally conductive material 310 extends directly from one component to another, in a straight line. Instead, it should be understood that heat could be transferred from one component to another component with a meandering route taken between the two components.

In some examples, the first coolant flowpath 115a is in thermal communication with the second heat source flowpath 120b via the thermally conductive material 310 between the first coolant flowpath 115a and the second heat source flowpath 120b. In some examples, first heat source flowpath 120a is in thermal communication with the second heat exchanger 122b via the thermally conductive material 310 between the first heat source flowpath 120a and the second heat exchanger 122b. In some examples, the non-moving components of the diverter 200 can be in thermal communication with the heat source flowpaths 120 via the thermally conductive material 310 between the diverter 200 and the heat source flowpaths 120. Even though several examples have been provided, it should be understood that many combinations of components of heat transfer unit 300 that are in thermal communication with each other are contemplated.

The heat transfer unit 300 can be a unitary component. As used herein, the term "unitary component" refers to the aspects of the component being formed together, or integrally fixed to one another. The heat transfer unit 300 may be formed as a unitary, monolithic component by manufacturing the heat transfer unit 300 with an additive manufacturing process. In another example, the heat transfer unit 300 is an assembly and portions of the heat transfer unit 300 are coupled together such that the portions are in thermal communication with each other. Those portions can be additively manufactured or manufactured with other conventional methods, such as machining the portions from a casting, forging, or bar stock. Either way, the thermally conductive material 310 between each of the heat exchangers 122 and/or heat source flowpaths 120 can draw heat from the heat exchangers 122 and/or the heat source flowpaths 120 to cool the heat transfer unit 300 via induction. Notably, even when coolant fluid is not being provided to one of the coolant flowpaths 115, the respective heat source flowpath 120 can still be cooled by the metal material that is surrounding the heat source flowpath 120, via induction.

In operation, a coolant fluid, such as fuel, enters the heat exchange system 100 through the input 111. The flow of coolant fluid can be provided to the diverter 200, which can selectively provide at least a portion of the flow to one or more of the coolant flowpaths 115 (FIG. 4 and FIG. 5) and/or to the bypass flowpath 117 (FIG. 5). The flow of coolant fluid can then flow through the heat exchangers 122 where it absorbs heat from the respective heat source flowpath 120, and then flows toward the output 119 where it exits the heat exchange system 100.

In one example, the first heat generating component 124a is an engine lubrication system that is used to lubricate bearings, the second heat generating component 124b is a fan pitch change mechanism, the third heat generating component 124c is a fan gearbox, and the fourth heat generating component 124d is an embedded motor generator. In this example, the diverter 200 can provide approximately 40%, such as between 30% to 50%, of the flow of coolant fluid to the first coolant flowpath 115a, and approximately 20%, such as between 10% to 30%, of the flow of coolant fluid to each of the second, third, and fourth coolant flowpath 115.

In other examples, there are three heat exchangers 122, three heat source flowpaths 120, and three heat generating components 124. The first heat generating component 124 is an engine lubrication system that is used for bearings, the second heat generating component 124 is a plurality of servos, and the third heat generating component 124 is an embedded motor generator. The diverter 200 can provide approximately 50%, such as between 40% to 60%, of the flow of coolant fluid to the first coolant flowpath 115, and approximately 25%, such as between 15% to 35%, of the flow of coolant fluid to each of the second and third coolant flowpaths 115. However, it should be understood that other combinations of ranges are contemplated, and that the distribution of the flow can change over time during operation of the engine.

For example, the amount of the flow of coolant fluid that is provided to each of the coolant flowpaths 115 and/or to the bypass flowpath 117 can be selectively adjusted based on one or more engine parameters. One of the engine parameters can be a temperature of one or more heat generating components 124. When it is determined that the temperature of the heat generating component 124 exceeds a threshold or calculated value, the diverter 200 can increase the amount of the flow of coolant fluid to be provided to the respective coolant flowpath 115. When it is determined that the temperature of the heat generating component 124 is less than a threshold or calculated value, the diverter 200 can decrease the amount of the flow of coolant fluid to be provided to the respective coolant flowpath 115.

One of the engine parameters can be the ratio of the amount of coolant fluid flowing through a heat exchanger 122 versus the amount of hot fluid flowing through the same heat exchanger 122. When the amount of coolant fluid, such as fuel, flowing through the heat exchanger 122 is much greater than the amount of hot fluid, such as a lubricant, flowing through the heat exchanger 122, such as a two to one ratio, a three to one ratio, a four to one ratio, the diverter 200 can allow more of the coolant fluid to be provided to the bypass flowpath 117 to reduce the pressure loss of the coolant fluid circuit 110.

One of the engine parameters can be a requested power level of the engine. When an increase to the power level is requested, fuel, a coolant fluid in some examples, can be provided to the bypass flowpath 117. Diverting more fuel to the bypass flowpath 117 can reduce the reaction time of the engine when an increase to the power level is requested. More specifically, when the throttle is moved to request more power output, additional fuel is supplied to the combustor of the engine. The fuel can be provided to the combustor quicker if it has a shorter flowpath to travel. As such, fuel that travels through the bypass flowpath 117 can be supplied to the combustor quicker than fuel that travels through one or more heat exchangers 122. Therefore, providing fuel to the bypass flowpath 117 reduces the reaction time of the engine when an increase to the power level is requested.

One of the engine parameters can be the current phase of flight that the aircraft is currently in. In some examples, when the aircraft that the engine is installed on is in flight, one heat generating component 124 may require more cooling, whereas another heat generating component 124 may require less cooling. Conversely, when the aircraft is on the ground, the cooling needs may be swapped. For example, a lubrication system for a propellor gearbox may require less cooling while the aircraft is in flight due to the ambient air in the flowpath being colder, whereas the lubrication system for an accessory gearbox or bearing system may require more cooling while the aircraft is in flight.

One of the engine parameters can be the current fuel consumption of the engine. For example, current fuel consumption is typically measured in gallons per hour (GPH) and is lowest when an aircraft is taxing or idling on the ground and the highest when the aircraft is taking-off or ascending. When the fuel consumption is low, less coolant fluid can be provided to the bypass flowpath 117, whereas more coolant fluid, as a percentage of total flow, can be provided to one or more of the coolant flowpaths 115. For example, when the fuel consumption is low, such as during taxing or idling on the ground, none of the flow of coolant fluid can be provided to the bypass flowpath or a small percentage, such as up to five percent, such as up to ten percent, of the coolant fluid can be provided to the bypass flowpath 117. The remaining amount of the flow of coolant fluid can be provided to the coolant flowpaths 115 and distributed to each based on other engine parameters, such as a desired temperature of the fluid flowing through the respective heat source flowpath 120.

In some examples, the amount of the flow of coolant fluid to be provided to the coolant flowpaths 115, and to the heat exchangers 122, can be optimized such that a minimal amount of coolant fluid is provided to each of the coolant flowpaths 115, the remainder of the coolant fluid is provided to the bypass flowpath 117. This allows a maximum amount of the flow of coolant fluid to be provided to the bypass flowpath 117 and not pass through any flow-restricting devices, such as heat exchangers 122, which can result in pressure loss. Bypassing a maximum amount of the flow of coolant fluid reduces the pressure loss experienced from the input 111 of the coolant fluid circuit 110 to the output 119 of the coolant fluid circuit 110, and also reduces the reaction time of the engine when additional power output is requested.

Figure 6:
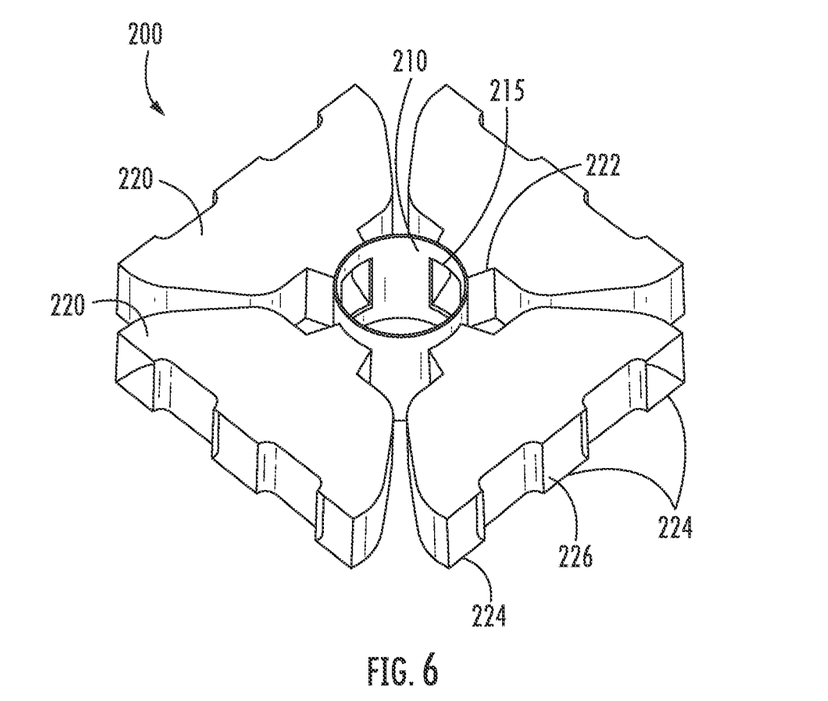
FIG. 6 is a perspective view of a diverter in accordance with an exemplary aspect of the present disclosure.
Figure 7:
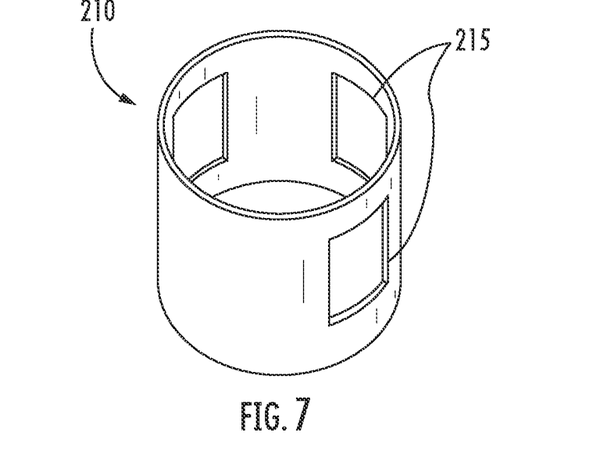
FIG. 7 is a perspective view of a drum of the diverter of FIG. 6 in accordance with an exemplary aspect of the present disclosure.

Referring now to FIG. 6, a perspective view of a diverter 200 in accordance with an exemplary embodiment of the present disclosure is shown. The diverter 200 in this example includes a drum 210 and branch housings 220. Each of the branch housings 220 can correspond to a coolant flowpath 115. As best seen in FIG. 7, the drum 210 includes one or more windows 215. The drum 210 can be configured to rotate on an axis such that one or more of the windows 215 align, either partially or fully, with a respective inlet 222 of a branch housing 220. Each branch housing 220 can further include one or more openings 224 that can align with one or more openings of a heat exchanger 122. As will be explained in more detail below, one or more, or all, of the openings 224 can be an outlet 226 for the coolant flowpath 115. The remaining openings 224, if any, can be inlets or outlets for the heat source flowpath 120.

Figure 8:
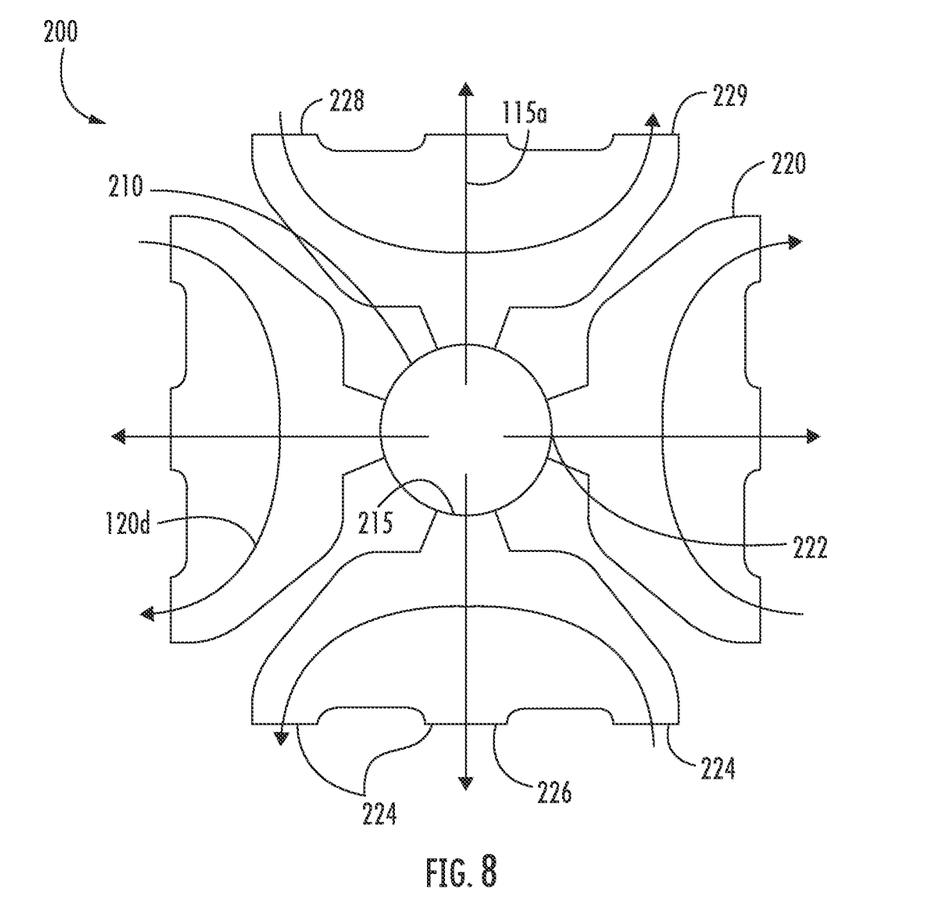
FIG. 8 is a cross-sectional, top-view of the diverter of FIG. 6 in accordance with an exemplary aspect of the present disclosure.

Referring now to FIG. 8, a top view of the diverter 200 of FIG. 6 in accordance with an exemplary embodiment of the present disclosure is shown. In operation, coolant fluid can flow from the input 111 of the coolant fluid circuit 110 to the drum 210 of the diverter 200. In this example, the coolant fluid enters the top of the drum 210. From the drum 210, the fluid can enter through one or more of the branch housing inlets 222 when the windows 215 are aligned, either partially or fully, with the respective branch housing inlets 222. From the branch housing inlet 222, the coolant fluid can flow through the branch housing 220 until it reaches an outlet 226. From the outlet 226, it can enter a respective heat exchanger 122.

One or more of the branch housings 220 can also have an opening that is a heat source inlet 228 and an opening 224 that is a heat source outlet 229. The relatively hot fluid from the heat source flowpath 120 can flow into the inlet 228, through the branch housing 220, and out of the outlet 229. The portions of the coolant flowpath 115 and the heat source flowpath 120 that extend through the branch housing 220 can be in thermal communication such that the coolant flowpath 115 absorbs heat from the heat source flowpath 120. In this way, the branch housing 220 can be an extension of the heat exchanger 122 to also cool the relatively hot fluid that is flowing through the heat source flowpath 120.

Figure 9A:
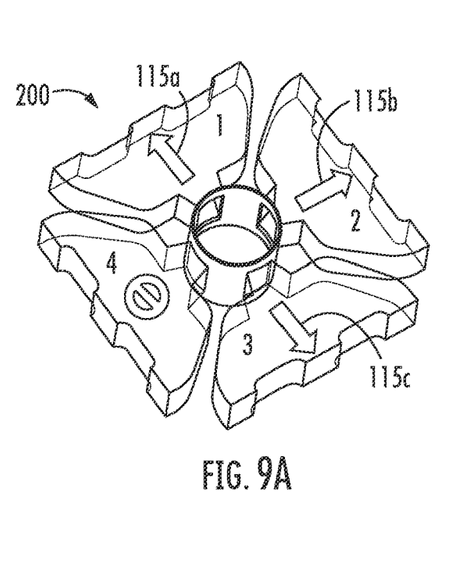
FIGS. 9A-9C are perspective views of different operational modes of the diverter of FIG. 6 in accordance with an exemplary aspect of the present disclosure.
Figure 9B:
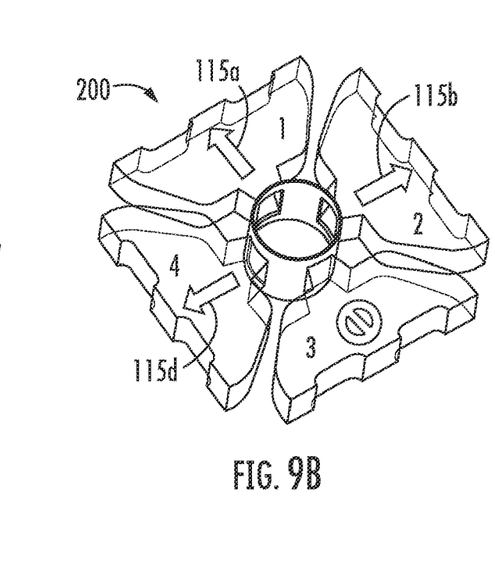
Figure 9C:
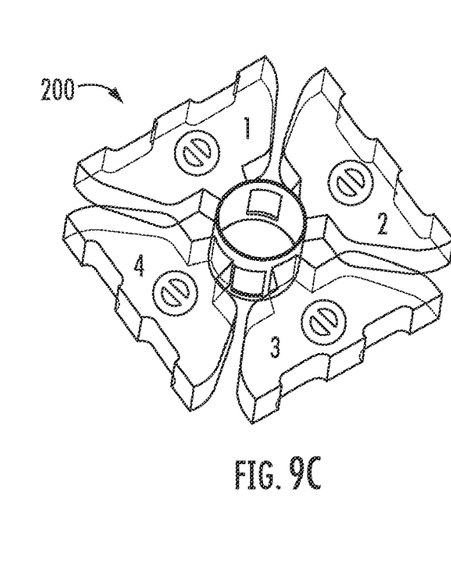

Referring now to FIGS. 9A-9C, a perspective view of the diverter 200 of FIG. 6 in different operational modes can be seen. As previously explained, the drum 210 can be rotated so that the windows 215 of the drum 210 align fully, or partially, with one or more branch housing inlets 222. When the windows 215 align with a branch housing inlet 222, coolant fluid is able to enter the respective coolant flowpath 115. More specifically, FIG. 9A shows the drum 210 so that one of the windows 215 is aligned with a first branch housing inlet 222a, one of the windows 215 is aligned with a second branch housing inlet 222b, and one of the windows 215 is aligned with a third branch housing inlet 222c. In this position, because there are only three windows 215 on the drum 210, a window 215 is not positioned with the fourth branch housing inlet 222d. Instead, a wall of the drum 210 covers the fourth branch housing inlet 222d. In this mode, the flow of coolant fluid is restricted from entering the fourth branch housing inlet 222d, but is allowed to enter the first, second, and third branch housing inlets 222a,b,c and their respective coolant flowpath 115a,b,c. The drum 210 in FIG. 9B is rotated counterclockwise by ninety degrees so that the wall of the drum 210 aligns with the third branch housing inlet 222c and one of the three windows 215 is each aligned with the first, second, and fourth branch housing inlets 222a,b,d. In this mode, the flow of coolant fluid is restricted from entering the third branch housing inlet 222c, but is allowed to enter the first, second, and fourth branch housing inlets 222a,b,d and their respective coolant flowpath 115a,b,d. The drum 210 in FIG. 9C is rotated by forty-five degrees such that none of the windows 215 align with any of the branch housing inlets 222. In this mode, the flow of coolant fluid is restricted from entering any of the branch housing inlets 222a-d.

In lieu of, or in addition to, the drum 210 rotating, sliding doors can be provide that selectively move in an upward and downward direction to control and throttle an amount of coolant fluid that enters each of the branch housing inlets 222. Additionally, an additional opening or port can be provided in the drum 210 to allow coolant fluid to enter the bypass flowpath 117.

The heat exchange system 100 as described has many benefits. First, by arranging the coolant flowpaths 115 and the heat exchangers 122 in a parallel configuration, instead of in series, the volume of coolant fluid in the heat exchange system 100 is reduced because the length of the path that the coolant fluid takes is reduced. Because some coolant fluids, such as fuel, are compressible and expandable, reducing the amount of coolant fluid within the system results in a reduced reaction time of the engine when an increase of power is requested.

Second, by arranging the coolant flowpaths 115 and the heat exchangers 122 in a parallel configuration, instead of in series, a pressure drop of the coolant fluid circuit 110, from the input 111 to the output 119, is reduced. Additionally, a bypass flowpath 117 can be provided to minimize the pressure drop from the input 111 to the output 119 of the coolant fluid circuit 110.

Third, by arranging the coolant flowpaths 115 and the heat exchangers 122 in a parallel configuration, instead of in series, flow can be more accurately calculated. Typically, sensors to measure fuel flow, a coolant fluid, are located upstream from the heat exchangers 122. If the heat exchangers 122 are in a series configuration, more variables exist to calculate the fuel flow into the combustor of the engine, making the calculation more complicated and less reliable. however, arranging the heat exchangers 122 in a parallel configuration removes many of the variables and simplifies the calculation, making it more reliable.

Fourth, by arranging the coolant flowpaths 115 and the heat exchangers 122 in a parallel configuration, instead of in series, the flow of coolant fluid that enters each coolant flowpath 115 can be optimized. More specifically, if the heat exchangers 122 were arranged in series, a certain flow of coolant fluid must enter each of the heat exchangers 122. However, with the parallel configuration, coolant fluid can be selectively diverted and/or throttled for current needs.

Fifth, by arranging the heat exchangers 122 in close proximity to each other (FIG. 4 and FIG. 5) and configured as a heat transfer unit 300, additional cooling can be realized, by induction, as previously explained. Therefore, even when coolant fluid is not being provided to one of the coolant flowpaths 115, the respective heat source flowpath 120 can still be cooled by the metallic material that is surrounding the heat source flowpath 120, via induction.

This written description uses examples to disclose the invention, including the best mode, and also to enable any person skilled in the art to practice the invention, including making and using any devices or systems and performing any incorporated methods.

The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

1. A heat exchange system for a gas turbine engine, the heat exchange system comprising a first heat exchanger defining a first heat source flowpath, a second heat exchanger defining a second heat source flowpath, and a coolant fluid circuit defining a first coolant flowpath extending through the first heat exchanger and in thermal communication with the first heat source flowpath, and a second coolant flowpath extending through the second heat exchanger and in thermal communication with the second heat source flowpath, wherein the first coolant flowpath and the second coolant flowpath are arranged in a parallel flow configuration.
2. The heat exchange system of any preceding clause, wherein the heat source flowpaths are fluidly independent.
3. The heat exchange system of any preceding clause, wherein a flow of coolant through the first coolant flowpath and the second coolant flowpath are independently adjustable.
4. The heat exchange system of any preceding clause, wherein the flow of coolant through the first coolant flowpath and the second coolant flowpath are independently adjustable based on an engine parameter.
5. The heat exchange system of any preceding clause, wherein a coolant fluid flowing through the coolant fluid circuit is a fuel.
6. The heat exchange system of any preceding clause, further comprising a diverter configured to separate a flow of coolant fluid into the first coolant flowpath and the second coolant flowpath.
7. The heat exchange system of any preceding clause, wherein the first heat exchanger, the second heat exchanger, the first coolant flowpath, and the second coolant flowpath form a heat transfer unit that is configured as a heat sink.

8. The heat exchange system of any preceding clause, wherein the heat transfer unit is a unitary component.

9. The heat exchange system of any preceding clause, wherein the first heat exchanger is coupled to or formed integrally with the second heat exchanger, and wherein the first heat exchanger is in thermal communication with the second heat exchanger.

10. The heat exchange system of any preceding clause, wherein the coolant fluid circuit further defines a bypass flowpath that is arranged in the parallel flow configuration with the first and second coolant flowpaths.

11. The heat exchange system of any preceding clause, wherein the heat exchange system further comprises a third heat source flowpath extending through a third heat exchanger, and the coolant fluid circuit further defines a third coolant flowpath that extends through the third heat exchanger and is in thermal communication with the third heat source flowpath.

12. A gas turbine engine having a compressor section, a combustion section, and a turbine section, the gas turbine engine comprising a first heat generating component and a second heat generating component, and a heat exchange system comprising a first heat exchanger defining a first heat source flowpath, the first heat source flowpath configured to receive a first fluid, the first fluid in thermal communication with the first heat generating component, a second heat exchanger defining a second heat source flowpath, the second heat source flowpath configured to receive a second fluid, the second fluid in thermal communication with the second heat generating component, and a coolant fluid circuit defining a first coolant flowpath extending through the first heat exchanger and in thermal communication with the first heat source flowpath, and a second coolant flowpath extending through the second heat exchanger and in thermal communication with the second heat source flowpath, wherein the first coolant flowpath and the second coolant flowpath are arranged in a parallel flow configuration.

13. The gas turbine engine of any preceding clause, wherein the heat source flowpaths are fluidly independent.

14. The gas turbine engine of any preceding clause, wherein a flow of coolant through the first coolant flowpath and the second coolant flowpath are independently adjustable.

15. The gas turbine engine of any preceding clause, wherein the flow of coolant through the first coolant flowpath and the second coolant flowpath are independently adjustable based on an engine parameter.

16. The gas turbine engine of any preceding clause, further comprising a diverter configured to separate a flow of coolant fluid into the first coolant flowpath and the second coolant flowpath.

17. The gas turbine engine of any preceding clause, wherein the first heat exchanger, the second heat exchanger, the first coolant flowpath, and the second coolant flowpath form a heat transfer unit that is configured as a heat sink.

18. The gas turbine engine of any preceding clause, wherein the first heat exchanger is coupled to or formed integrally with the second heat exchanger, and wherein the first heat exchanger is in thermal communication with the second heat exchanger.

19. The gas turbine engine of any preceding clause, wherein the coolant fluid circuit further defines a bypass flowpath that is arranged in the parallel flow configuration with the first and second coolant flowpaths.

20. The gas turbine engine of any preceding clause, wherein the heat exchange system further comprises a third heat source flowpath extending through a third heat exchanger, and the coolant fluid circuit further defines a third coolant flowpath that extends through the third heat exchanger and is in thermal communication with the third heat source flowpath.

I claim:

1. A heat exchange system for a gas turbine engine, the heat exchange system comprising:
   a coolant fluid circuit comprising:
      an inlet fluidly coupled to a fuel supply, an outlet fluidly coupled to a combustor, a plurality of coolant flowpaths defined between the inlet and the outlet, and a diverter fluidly coupled to the inlet, the outlet, and to each coolant flowpath of the plurality of coolant flow paths, wherein the diverter is configured to selectively regulate or stop a flow of fuel from the fuel supply to each respective coolant flowpath of the plurality of coolant flowpaths via one or more partitions defined within the diverter; and
      a plurality of heat exchangers, wherein each heat exchanger of the plurality of heat exchangers defines a respective heat source flowpath, wherein each coolant flowpath extends through a respective heat exchanger of the plurality of heat exchangers between the inlet and the outlet of the coolant fluid circuit.

2. The heat exchange system of claim 1, wherein each heat source flowpath is fluidly independent.

3. The heat exchange system of claim 1, wherein the flow of fuel through each coolant flowpath of the plurality of coolant flowpaths is independently adjustable via the diverter.

4. The heat exchange system of claim 3, wherein the flow of fuel through each coolant flowpath of the plurality of coolant flowpaths is independently adjustable based on an engine parameter of the gas turbine engine.

5. The heat exchange system of claim 1, wherein the plurality of heat exchangers includes a first heat exchanger and a second heat exchanger, and wherein the plurality of coolant flowpaths includes a first coolant flowpath and a second coolant flowpath, wherein the first heat exchanger, the second heat exchanger, the first coolant flowpath, and the second coolant flowpath form a heat transfer unit that is configured as a heat sink.

6. The heat exchange system of claim 5, wherein the heat transfer unit is a unitary component.

7. The heat exchange system of claim 5, wherein the first heat exchanger is coupled to or formed integrally with the second heat exchanger, and wherein the first heat exchanger is in thermal communication with the second heat exchanger.

8. The heat exchange system of claim 1, wherein the plurality of coolant flowpaths includes a first coolant flowpath and a second coolant flowpath, and wherein the coolant fluid circuit further defines a bypass flowpath that is arranged in a parallel flow configuration with the first and second coolant flowpaths.

9. The heat exchange system of claim 1, wherein the plurality of coolant flowpaths comprises three or more coolant flowpaths and the plurality of heat exchangers comprises least three or more heat exchangers.

10. A gas turbine engine having a compressor section, a combustion section, and a turbine section, the gas turbine engine comprising:
- a heat exchange system comprising:
  - a coolant fluid circuit comprising:
    - an inlet fluidly coupled to a fuel supply, an outlet fluidly coupled to the combustion section, a plurality of coolant flowpaths defined between the inlet and the outlet, and a diverter fluidly coupled to the inlet, the outlet, and to each coolant flowpath of the plurality of coolant flow paths, wherein the diverter is configured to selectively regulate or stop a flow of fuel from the fuel supply to each respective coolant flowpath of the plurality of coolant flowpaths via one or more partitions defined within the diverter; and
    - a plurality of heat exchangers, wherein each heat exchanger of the plurality of heat exchangers defines a respective heat source flowpath, wherein each coolant flowpath extends through a respective heat exchanger of the plurality of heat exchangers between the inlet and the outlet of the coolant fluid circuit.

11. The gas turbine engine of claim 10, wherein each respective heat source flowpath is fluidly independent.

12. The gas turbine engine of claim 10, wherein the flow of fuel through each coolant flowpath of the plurality of coolant flowpaths is independently adjustable via the diverter.

13. The gas turbine engine of claim 12, wherein the flow of fuel through each coolant flowpath of the plurality of coolant flowpaths is independently adjustable based on an engine parameter of the gas turbine engine.

14. The gas turbine engine of claim 10, wherein the plurality of heat exchangers includes a first heat exchanger and a second heat exchanger, and wherein the plurality of coolant flowpaths includes a first coolant flowpath and a second coolant flowpath, wherein the first heat exchanger, the second heat exchanger, the first coolant flowpath, and the second coolant flowpath form a heat transfer unit that is configured as a heat sink.

15. The gas turbine engine of claim 14, wherein the first heat exchanger is coupled to or formed integrally with the second heat exchanger, and wherein the first heat exchanger is in thermal communication with the second heat exchanger.

16. The gas turbine engine of claim 10, wherein the plurality of coolant flowpaths includes a first coolant flowpath and a second coolant flowpath, and wherein the coolant fluid circuit further defines a bypass flowpath that is arranged in a parallel flow configuration with the first and second coolant flowpaths.

17. The gas turbine engine of claim 10, wherein the plurality of coolant flowpaths comprises three or more coolant flowpaths and the plurality of heat exchangers comprises least three or more heat exchangers.

* * * * *